Nov. 18, 1969  D. F. KISTER  3,478,767
GATED OSCILLATOR DIGITAL CONTROLLER
Filed Jan. 27, 1965  5 Sheets-Sheet 1

INVENTOR.
DALE F. KISTER
BY R. E. Geanger
ATTORNEY

INVENTOR.
DALE F. KISTER
BY R.E. Geangue
ATTORNEY

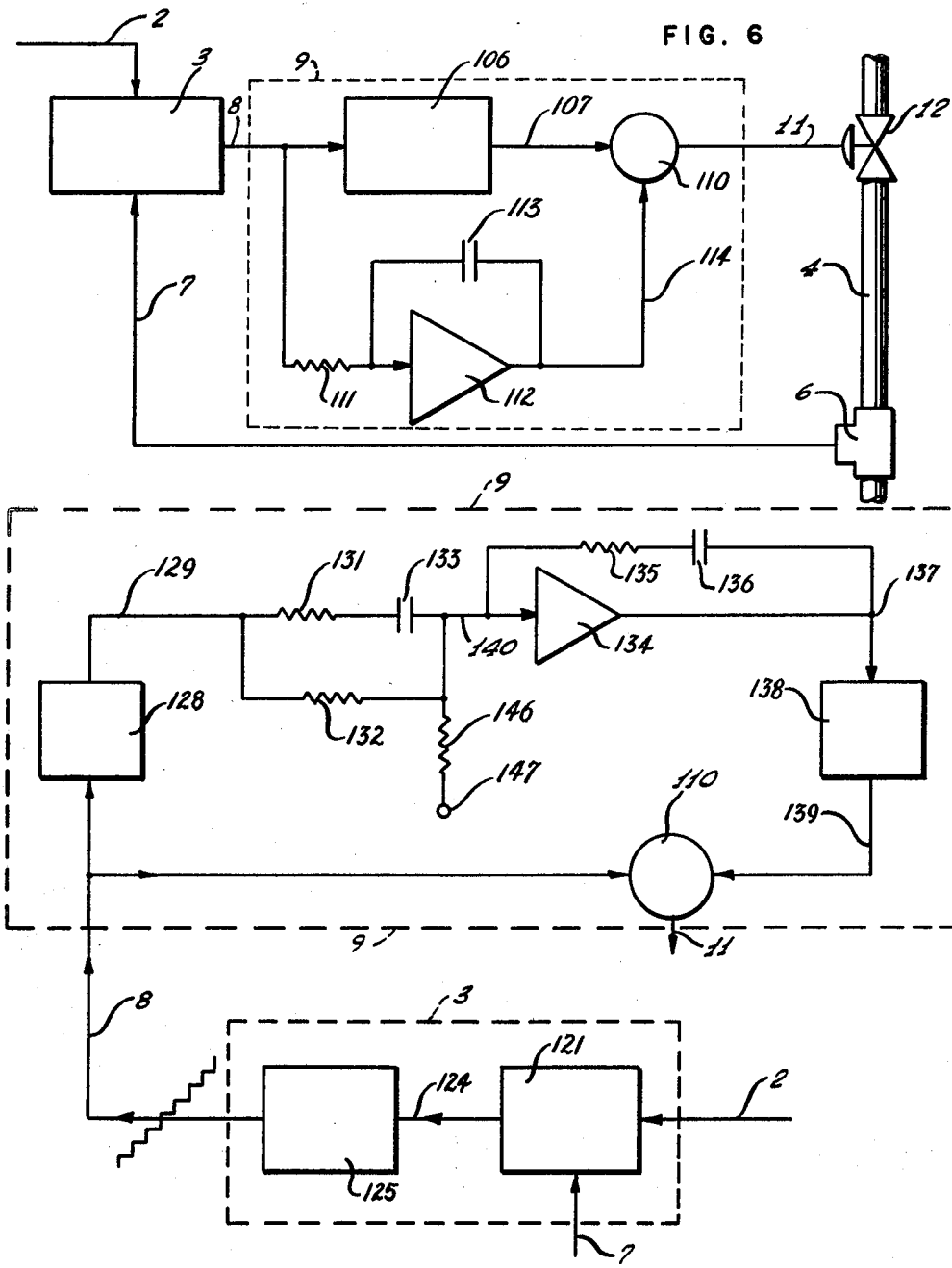

3,478,767
GATED OSCILLATOR DIGITAL CONTROLLER
Dale F. Kister, Thousand Oaks, Calif., assignor to The Foxboro Company, Foxboro, Mass.
Filed Jan. 27, 1965, Ser. No. 428,362
Int. Cl. G05d *11/00;* G05b *15/00, 19/30*
U.S. Cl. 137—88        6 Claims

ABSTRACT OF THE DISCLOSURE

Digital signals representing demand rate and volume of flow of a constituent are supplied to a bi-directional accumulator. The output of the accumulator is converted to a control signal, which controls the volume of flow. When such output reaches a predetermined value, the demand rate signals are inhibited.

---

This invention relates to automatic digital controllers of the type employed in automatic process control systems, and more particularly to a digital controller which maintains a preset ratio between two or more process variables and which automatically initiates an inhibiting control signal to hold back a particular process variable in the event that one or more of the remaining process variables tend to exceed a preset limit.

There is disclosed in patent application Ser. No. 99,096, entitled Ratio Computer, filed Mar. 29, 1961, now Patent No. 3,219,046 and assigned to the same assignee as the present application, a digital ratio computer for continuous process control. The present invention is useful in process control systems of the type disclosed therein. In such systems a plurality of input variables, having the form of time-digital signals representative of real-time process parameters, are combined to provide, at the output, a process control signal having a numerical value which corresponds to the instantaneous ratio of the input variables. Any departure of the input variables from a preselected ratio will be reflected in this output and by means of a servo system responsive thereto appropriate corrective action will automatically be effected. In such a system, the apparatus numerically compares the quantity of materials involved in the process in relation to the numerical rate of a digital pacing signal. The pacing signal establishes the desired production rate and departures from an established ratio between this rate and the rates of the remaining process variables will cause the generation of a digital control signal numerically indicating the excess or deficiency in production components.

Such a system is particularly adapted to process control systems in which the materials involved in the process exist as discrete units which may be counted. That is, the present invention may be applied to automatic control systems in which individual items are supplied on separate conveyors, or the like, to be combined to provide a mixture in a receiving channel, the total of which is comprised of a given number of the items supplied from the separate conveyors. The total number of units counted in the first channel as compared with the accumulated total representing the sum of a first channel and second channel; this sum may be made to comprise any desired ratio of the two supply channels by dividing the accumulated total by a factor representing the desired ratio of the units in the first channel to the combined total. It is not necessary that the nature of the materials being handled in the process be discrete physical units since suitable transducers may be employed to provide appropriate counting signals in response to the supply of continuous materials, such as fluids, moving in a supply channel. Typical of such a case is a fluid blending system in which a plurality of fluid components are blended in accordance with preset ratios to provide a mixture having desired quantities of component fluids mixed therein. In such systems the flow rates of the fluids are measured by suitable transducers capable of providing time-digital output signals to the digital controller system.

The advantage of a digitally controlled blending system is that the blend ratios may be entered in convenient numerical form and the accuracy of the system, as well as the repeatability of the system may be precisely and predictably stated.

Digital techniques are also favored in many process control applications due to their favorable signal-noise ratio, their capability of remote operation without degradation of the signal in the transmission channel, and their convenience of recording or display of process variables. Digital accuracy is particularly important in those applications in which the process depends on small differences of large quantities. Furthermore, an all-digital system will provide an accurate proof of performance by means of individual totalizers which automatically accumulate the total flow in any or all lines. These totals may be employed to effect corrective action if for any reason one of the fluids is impeded or mechanical failure of the equipment occurs. The apparatus of the present invention will automatically respond to such exigencies to maintain a correctly proportioned final product.

The present invention more particularly relates to improvements in apparatus of the type which numerically totalizes the quantity of the material processed with relation to the numerical rate of a preselected digital pacing signal. In digital systems of the type described in the aforementioned patent application, if for any reason the supply of one of the process constituents is impeded or there is a mechanical failure in the equipment, the individual totalizers automatically accumulate the total flow in any and all lines. Upon restoring the system to operation after the departure from normal process conditions, the apparatus of such prior systems will automatically restore the entire shortage or subtract the overage until the accumulated total at the output is completely satisfied in terms of a correctly proportioned finished product.

The system can keep track of the volumetric error of the lacking components so long as the magnitude of the error remains within the capacity of the totalizer or system memory. It is important to note, however, the effect on blend accuracy during the period that the system is correcting for a process disturbance. Although the controller will hold the valve open and maintain maximum flow rate until the error in the memory is returned to the desired steady-state control point, the blend will be out of specification during "lean" periods when the component is lagging behind, as well as "rich" during the period when the error is being corrected. This type of error is particularly detrimental in pipe line shipping operations where the blend is sent directly into a pipe for distribution to remote locations. In such operations, the blend may be tapped off at any point along the line and ideally the entire length of the line should contain a blend which meets specification to avoid the possibility of drawing off an inferior product.

By the present invention there is provided novel means for overcoming the above-noted difficulties and shortcomings of prior digital process control systems. The invention has two aspects, the first of which relates to the gating of the master pacing signal to inhibit demand flow pulses to all of the component comparator circuits whenever an individual component begins to lag. The inhibiting control signal is developed as soon as one component requires a full open valve to maintain the flow rate demanded. The advantage of this system is that the blend product is maintained within specifications even during an adverse reduction in the originally established production rate and production will be carried out thereafter in the minimum time possible under the circumstances. Another advantage of this system is the reduction in the required error memory capacity.

The second aspect of the invention relates to an integral-plus-proportional control system, referred to hereinafter as reset action control and operates to shorten the time required to reach stable operation following startup or a severe disturbance in the production rate. This feature of the invention comprises circuit means wherein an analog signal for controlling the valve servomotor is supplied to one input of a summing circuit directly and is supplied to the other input of the summing circuit via an integrator. This arrangement provides a valve control signal at the output of the summing circuit which is made up of the sum of the error signal and its time integral. That is, the valve control signal has a component which is proportional to the time integral of the deviation. This will reduce the volumetric offset error which characteristic of both expected and unexpected transient changes in the system's operation.

It is therefore a principal object of the invention to provide a novel and improved digital controller apparatus for automatic process control systems which will automatically compensate for exigencies in process variables.

Another object of the invention is to provide a novel and improved digital blending control apparatus for automatically compensating for disturbances in the blending process.

An object of the invention is to provide a novel and improved apparatus for automatically cutting back the rate of production of an automatically controlled process in the event of an adverse diminution of one of the process constituents.

It is another object of the invention to provide a novel and improved digital controller for reducing offset errors, arising from process transients, to a negligible value.

It is still another object of the invention to provide a novel and improved digital controller having multiple control modes for providing proportional action, integral action, and derivative action.

Yet another object of the invention is to provide novel and improved automatic process control apparatus having integral-plus-proportional control.

A general object of this invention is to provide a novel and improved gated oscillator digital controller which overcomes the disadvantages of previous means and methods heretofore intended to accomplish generally similar purposes.

These and other objects of the invention will in part be obvious and will in part appear hereinafter.

Many other advantages, features and additional objects of the invention will become manifest to those versed in the art upon making reference to the detailed description which follows and to the accompanying sheets of drawings in which preferred structural embodiments, incorporating the principles of the present invention are shown by way of illustrative examples.

In the drawings:

FIGURE 6 is a schematic circuit diagram illustrating one feature of the invention;

Figure 7:
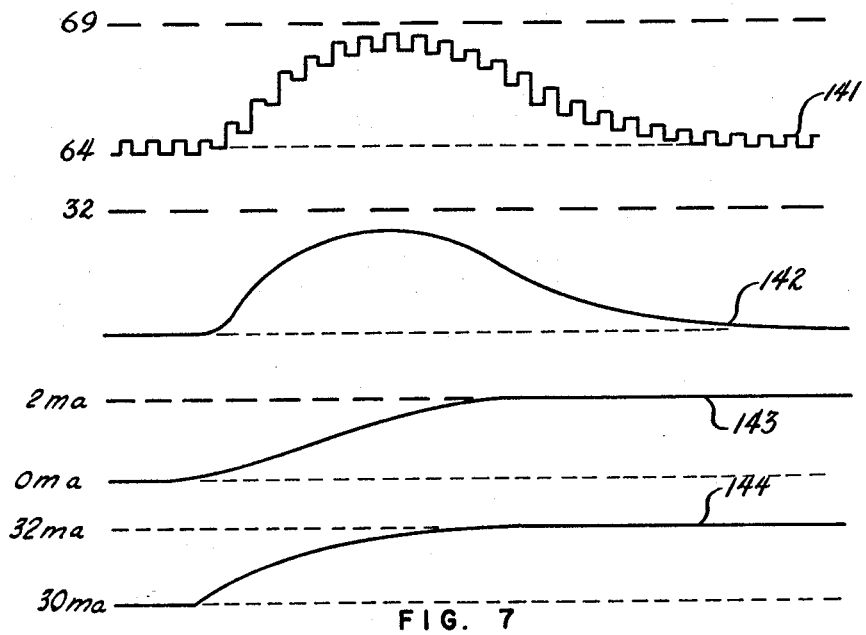

FIGURE 7 comprises four individual waveforms illustrating the operation of the circuit of FIGURE 6;

FIGURE 8 is a schematic circuit diagram of a modified form of the apparatus of FIGURE 6.

Figure 9:
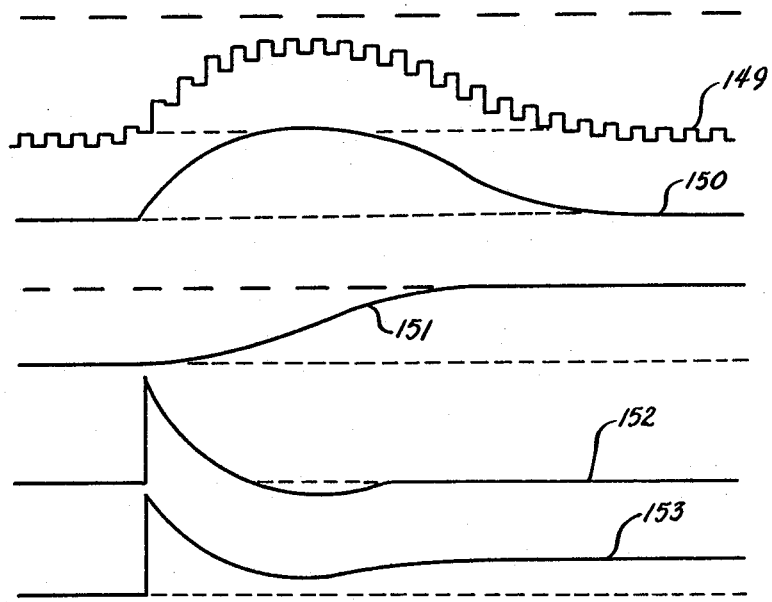

FIGURE 9 comprises five waveforms illustrating the operation of the circuit of FIGURE 8.

Inasmuch as each of the functional units represented by a rectangle in the block diagrams of FIGURES 1, 3, 4, 6 and 8 may be any one of the numerous devices for each respective function well known in the art, it is deemed unnecessary to show circuit details of these units. Each block diagram taken in conjunction with the operating waveforms therefor comprises an exposition of the invention which is believed to be sufficient to enable those skilled in the art to practice it.

Useful applications of the system disclosed herein are many, only one of which is its application in fluid blending. This typical use is described in detail hereinafter merely to illustrate the operation of the invention and facilitate teaching the concepts inherent therein.

Figure 1:
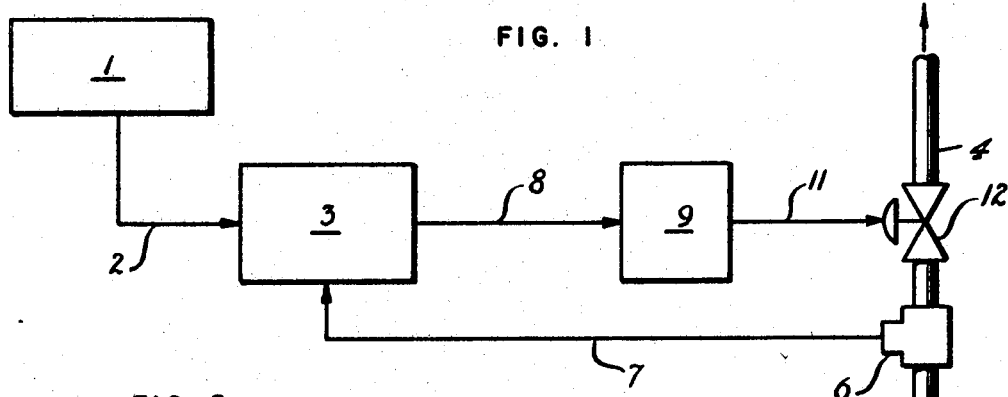
FIGURE 1 is a simplified block diagram of a digital blending system control loop.

Referring now to FIGURE 1 there is shown a basic digital blending control loop of the type to which the controller of the present invention may be applied. This arrangement includes a demand pulse generator 1 which sets the demand rate or the system production rate. The output of the demand pulse generator 1 is supplied via line 2 to a bi-directional accumulator 3 or add-subtract counter. The demand pulse generator output pulses appearing on line 2 comprise demand pulses each of which represents a unit volume of fluid. These pulses are supplied to the add input of the bi-directional accumulator.

The flow line 4 is provided with a turbine-type flow sensor 6 or other time-digital flow transducer which provides an output pulse for each unit volume of fluid moving therethrough in the direction of arrow 5. The pulses from the flow sensor 6, representing actual flow rate, are supplied to the subtract input via line 7 of the di-directional accumulator 3. The output of the accumulator 3 appearing on line 8 comprises a staircase signal, the amplitude of which corresponds to the algebraic difference between the inputs on lines 2 and 7. In a typical case, the count differential capacity of the accumulator is one-hundred twenty-eight steps or counts. Thus, the staircase voltage ramp on line 8 will have one-hundred twenty-eight dscrete voltage levels. The staircase signal from the accumulator 3 is supplied to servoamplifier 9 which converts it to a proportional control signal on line 11 for operating motor valve 12 in the flow line 4. In a typical construction the current amplitude range of the signal on line 11 is 10 to 50 milliamperes. Motor valve 12 regulates the flow in line 4.

Figure 2:
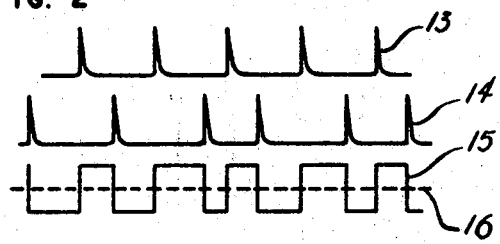
FIGURE 2 is a waveform diagram of assistance in the exposition of the invention.

The flow sensor 6 emits a pulse for each unit of fluid that passes through line 4. These pulses are called "process" pulses since they reflect the rate at which the process is proceeding. With each pulse from the demand input (2), the valve 12 sees an increasing step in the staircase command signal on line 8 calling for greater valve opening with subsequent increase in process flow in line 4. The pulses from the demand pulse generator 1 are referred to as "demand pulses". Each process pulse subtracts one step from the accumulator staircase signal output (8), tending to close the valve 12. When the flow is such as to produce a process (subtract) pulse for each demand (add) pulse, the control loop is said to be "lined out" and "on blend". The signal on line 11 to valve 12 alternates between two adjacent levels in response to the accumulator staircase signal as indicated in FIGURE 2.

The first waveform 13 indicates demand pulses from the demand pulse generator 1 and as can be seen they comprise a series of uniformly spaced repetitive pulses at a preset frequency. This repetition rate is set to establish the desired flow rate. The second waveform 14 comprises a series of process pulses generated by the output of the flow sensor 6 and will be more or less uniformly spaced when the process is "on blend" and will be variably spaced as the process shifts through transitional operating conditions. The output of the servo valve amplifier 9 comprises a square wave signal 15, the average value 16 of which determines the valve setting. As can be seen, the leading edge of each square wave is determined by the occurrence of a demand pulse 13 and the trailing edge of each square wave is determined by the occurrence of each process pulse 14. The signal to valve 12 alternates between adjacent steps in the accumulator staircase (on line 8) and the average value determines the valve position required to maintain the desired process flow rate.

Figure 3:
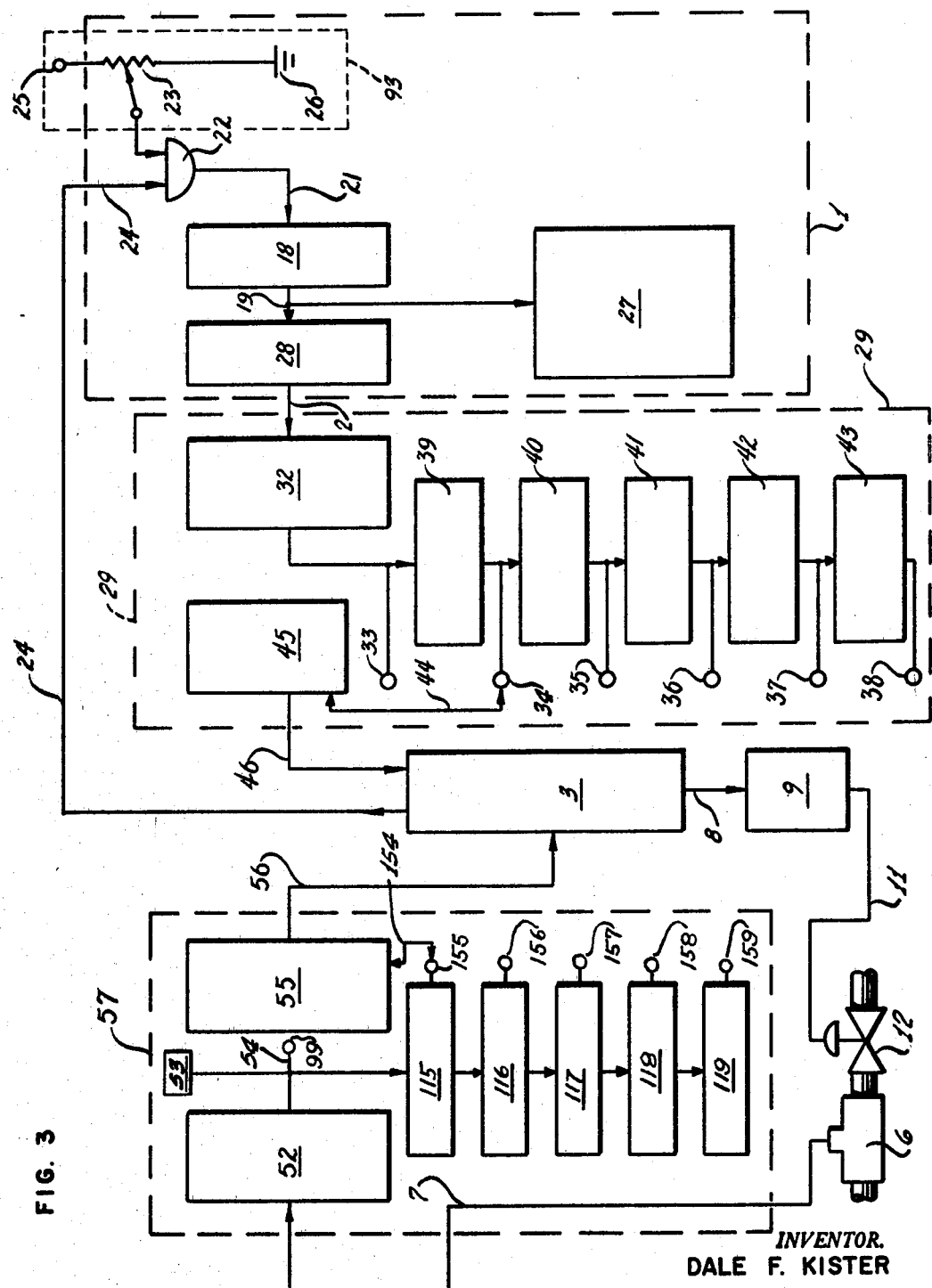
FIGURE 3 is a more detailed block diagram of the apparatus of FIGURE 1.

There is shown in FIGURE 3 a more detailed block diagram of a control loop of the type shown in FIGURE 1. The demand pulse generator 1 comprises a voltage controlled oscillator 18. The output pulses from voltage controlled oscillator 18 appear on line 19 and their frequency is determined by the amplitude of the control voltage appearing on line 21. The control voltage on line 21 is derived from potentiometer 23 via "and" gate 22. One input of "and" gate 22 is obtained from master demand rate control 93 comprising potentiometer 23 and the other input is obtained from control line 24. Potentiometer 23 is the demand pulse generator rate adjustment control which permits a manual selection of the desired production rate. A voltage is impressed across potentiometer 23 from a suitable fixed voltage reference source (not shown). The reference voltage is applied to terminal 25 and the other end of the potentiometer is connected to ground 26. The control input line 24 will be described more fully hereinafter.

The demand pulses appearing on line 19 may optionally be supplied to a numerical display unit 27. This may comprise a digital totalizer with suitable frequency dividers in series with its input so that the number displayed is in the desired measuring units for displaying the instantaneous production total. The pulses appearing on line 19 are also supplied to one-shot multivibrator 28 which establishes the desired pulse width for controlling ratio scaler 29.

The pulse train signal appearing on line 2 is supplied to a frequency divider 32 which divides the incoming frequency to establish the correct decimal setting so that a ratio in terms of percentage will be established. This standardized output is then supplied directly to switch contact 33, and to contacts 34–38 via frequency dividers 39–43, respectively. Frequency divider 39 divides the signal from divider 32 by two, dividers 40–42 each divide the incoming frequency by a division of five, and divider 43 divides the input by four. The moving switch contact 44 permits various output frequencies to be supplied to one-shot multivibrator 45 in accordance with the desired blend ratio. The output pulse from the frequency divider chain is suitably shaped by multivibrator 45 and supplied on output line 46 which comprises the add input to bi-directional accumulator 3.

Flow sensor 6 in line 4 supplies input pulses via line 7 to decimal frequency divider 52. This divider suitably scales the output of sensor 6 to desired measuring units. The output of decimal frequency divider 52 is supplied to a numerical display 53 which accumulates and displays the total quantity of fluid which passes through line 4. The pulse train signal appearing on line 54 is also supplied via line 154 to one-shot multivibrator 55 either directly or via an appropriate one of five frequency dividers identified as 115–119. The output of multivibrator 55 suitably shapes the pulses for input to the bi-directional accumulator 3 supplied on line 56. Frequency dividers 115–119 divide the incoming signal from flow sensor 6 by an appropriate scale factor to facilitate setting of the correct decimal value require to establish the blend ratio in terms of percentage. The frequency-adjusted output is supplied directly to switch contact 99, and to contacts 155–159 via frequency dividers 11$–119, respectively, on line 154. Frequency divider 115 divides the signal from decimal frequency divider 52 by two, each of the dividers 116–118 divide the incoming frequency by a divisor of five, and divider 119 divides the signal by four. Line 56 carries the subtract input of bi-directional accumulator 3. Divider 52 and the related elements responsive to the output of the flow sensor may collectively be identified as flow sensor scaler 57.

The output of the bi-directional accumulator 3 comprises a staircase voltage error signal, preferably having a range of one-hundred twenty-eight discrete steps, appear on line 8 and comprises the input to the valve servoamplifier 9. The output from the valve servoamplifier 9 is supplied on line 11 and is in the form of a control current for operating motor valve 12.

If a flow restriction, other than that of valve 12, were to occur, such as may result from a clogged strainer, the process-pulse rate would initially slow down due to the slower flow rate while the demand-pulse rate would continue at the preset frequency. Under these new conditions each demand-pulse would not be cancelled by the timely arrival of a process-pulse and the staircase output signal from the accumulator 3 would step up to a new level sufficient to further open valve 12 and re-establish the required process flow rate. This situation is illustrated in the waveforms of FIGURE 5.

Figure 5:
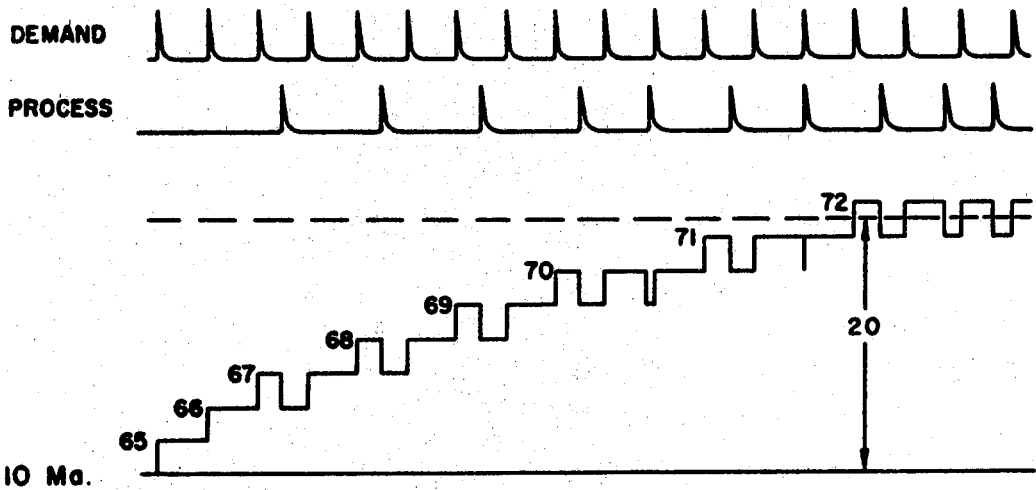
FIGURE 5 illustrates three individual waveforms, having a common time base, which illustrate the operation of the invention during a change in the process rate.

With reference to FIGURE 5, eight extra demand pulses are required to reposition the valve. These pulses represent eight units (indicated at 20) of volume demanded but not supplied by the process. In other words, an eight unit "offset" error exists in the process.

The example of FIGURE 5 considers only a small offset due to a partial restriction. An even larger offset is produced when a blend start-up is executed due to accumulation of demand pulses when opening the valve from its initial start blend position. The automatic compensation for "offset" error in accordance with the present invention will be described in a subsequent part of this specification.

In the event that the output of the servoamplifier 9 calls for a full open condition of valve 12, the output of flow sensor 6 will not be sufficient to keep pace with the demand pulses. Under this operating condition it becomes necessary to cut back the repetition rate of the demand pulses.

The bi-directional accumulator 3 is so constructed that when some preselected output count or step-level is reached, say a count of +72, the control signal on line 24 will be cut off. The signal on line 24 is supplied to one input of "and" gate 22; thus, termination of the control voltage on line 24 will inhibit the reference voltage to oscillator 18. The consequence of this condition is that the generation of demand pulses will be inhibited until the +72 count is reduced to +71. Thus, the signal on line 24 gates the output of oscillator 18. A +72 output from accumulator 3, which could call for a full open condition of valve 12, will by this mechanism automatically reduce the production rate set by the demand pulses. As can be seen, this newly established steady-state condition will set a new production rate which is the maximum consistent with the newly established operating conditions.

At such time as the adverse restriction in the blend line is removed, the blend flow rate will increase and thereby increase the frequency of the process pulses. An increase in the repetition rate of the process pulses will call for a reduction in the valve setting and the output of the accumulator will be reduced from +72 to some lower count which will remove the inhibit signal to gate 22. As a consequence the original higher production rate will be re-established.

To facilitate an explanation of the manner in which the system may operate with multiple blend lines, there will now be described a system having a plurality of controllers responsive to a single master pacer.

Figure 4:
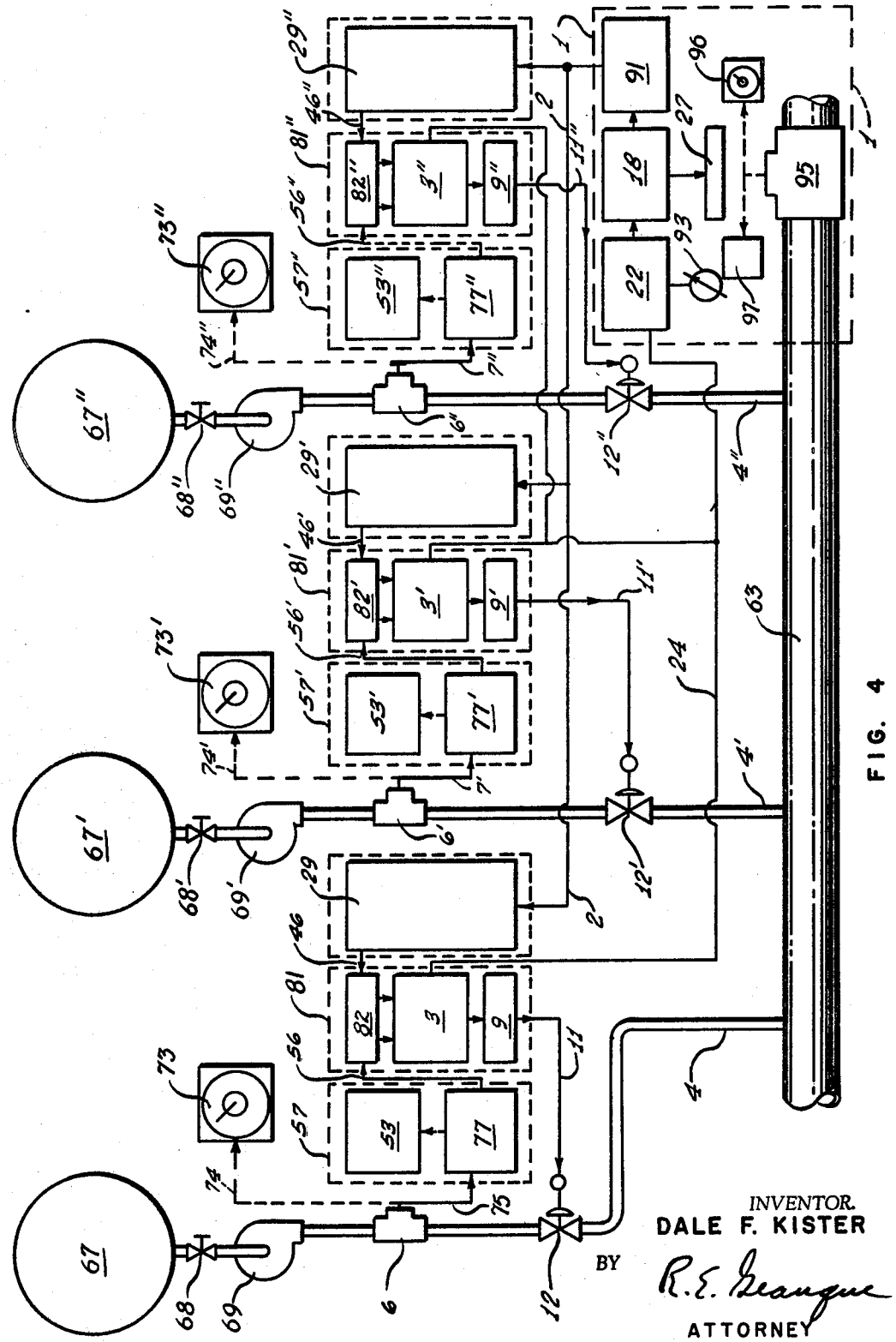
FIGURE 4 is a block diagram of a fluid blending system comprising three blend stations.

There is shown in FIGURE 4 a typical system for blending refinery stocks and additives. This system comprises a plurality of control loops of the type previously described in connection with FIGURES 1 and 3. The main line 63 or header containing the blended product is manifolded with a plurality of blend lines of which 4, 4', 4" are typical. The first blend station comprises tank 67 which is connected to blend line 4 via shut-off valve 68, pump 69, flow sensor 6 and motor valve 12.

The output of flow sensor 6 may optionally be supplied to a component flow-rate indicator 73 via line 74, to indicate the rate at which fluid in tank 67 is being transferred into line 4. The output of the flow sensor 6 is supplied to ratio-setter 57 comprising standardizer 77 and totalizer 53. The standardizer converts the output of sensor 6 to desired units of measurement (e.g. gallons or barrels) and the quantity of fluid transferred to line 63 is indicated by totalizer 53. The standardized output appearing on line 56 is supplied to one input of coincidence detector 82 in controller 81. The alternate input to the coincidence detector 82 is obtained from ratio scaler 29. The signals from the ratio scaler 29 are derived from the demand pulse generator 1 on line 2 as will appear hereinafter. The coincidence detector 82 precludes simultaneous arrival of an add pulse on line 2 and a subtract pulse on line 56, from going unrecognized. The add and subtract outputs from the coincidence detector 82 are supplied to corresponding inputs of bi-directional accumulator 3. The output from the accumulator 3 is supplied to the servoamplifier 9 which in turn drives motor valve 12 via line 11.

Ratio scaler 29 suitably modifies the demand pulse generator 1 demand pulses on line 2 to conform to the desired percentage of blend fluid to be added to the main line 63.

The additional blend stations are structurally similar to the blend station just described and corresponding elements carry similar identifying numbers except they are additionally identified by the marks ' and ".

The demand pulse generator 1 includes voltage controlled oscillator 18, the output of which is changed to a suitable rate by frequency divider 91 and supplied via line 2 and ratio scalers 29, 29' and 29" to the add inputs of the various bi-directional counters 3, 3' and 3" via coincidence detectors 82, 82' and 82", respectively. Oscillator 18 is controlled by inhibiting action of gate 22, one input of which is from the master demand rate control 93 and the other input of which is the inhibit control signal appearing on line 24.

A master flow sensor 95 may be provided to measure the total flow of the blended product and/or to indicate the product flow rate, but does not enter into the control function. The product total may be indicated by means of totalizer 97. A rate indicator responsive to flow sensor 95 is indicated at 96. If desired, suitable apparatus may be provided to initiate a system shut-down signal in response to a preselected total as measured by flow sensor 95. The operator sets a dial on the master station (control 93) to establish the product flow rate. The demand totalizer 27 indicates the amount of blend signalled by the oscillator 18. Its total (27) compared with the amount actually blended (97) is an indication of proper system functioning.

The system, in effect, continuously compares the ratio between the total accumulated flow (73, 73' and 73") from each component and the total accumulated signal (27) from the demand pulse generator 1. When a departure from the preselected ratio between these two values, for any component line, occurs, the control loop functions to position a corresponding valve in the line to correct the deviation.

In the system just described, the valve positions are determined by the outputs of their corresponding controllers 81, 81', and 81" exclusively, and is called "proportional control." In a practical construction, usually 30 to 1,000 digits are allocated in the bi-directional accumulator for valve control, but 100 discrete valve positions is an adequate compromise between resolution and equipment economy. Considerations of system stability dictate that the frequency of the input signals to the accumulator be related to the number of steps in this "proportional band." As a rough approximation, the maximum operating frequency in cycles per second for open-valve, maximum-flow conditions, is approximately one third of the number of digits in the proportional band. A system with 1,000 steps for valve control might operate at frequencies between 300 and 400 cycles per second at maximum flow rates as compared with 30 to 40 cycles per second (c.p.s.) for a 100-step proportional band system. As can be seen, at the higher operating flow rates with their higher frequency inputs, a large memory capacity is required beyond the proportional band. To illustrate, consider a 1,000-step proportional band system with a demand input rate of 333 c.p.s. With a single input, only 3 seconds is required to traverse the proportional part of the memory. This situation might arise if a pipe should become clogged at a protective strainer section of the controlled component.

In order to provide sufficient time for an operator to analyze this adverse situation and take remedial action without loss of error information, memories having a capacity of as much as 500,000 to 1,000,000 have been used in systems with 1,000 steps in the proportional band. This memory capacity represents a significant portion of the cost of a controller; therefore, eliminating the requirement for a memory of this size by the above described gated oscillator apparatus of the invention represents a substantial cost saving.

Summarizing, demand pulse generator 1 shown in FIGURE 4 provides demand pulses to all component blend sub-systems. It is proportioned to each component in the blend in accordance with the desired blend ratio. For example, if it is desired that a blend contain 80% of the component in tank 67 and 20% of the component in tank 67', then for every 10 pulses originating from the demand pulse generator 1, eight pulses would be proportioned to controller 81 while only two pulses would be delivered to controller 81'. The proportioning remains fixed during the blend, and if the blend production rate requires changing an operator merely adjusts the pulse rate of the demand pulse generator 1 by means of control 93. Usually, the demand pulse generator 1 is adjusted to the maximum permissible rate to reduce the time necessary to complete the blend.

Each component in the blend system has a flow rate beyond which it is incapable of exceeding. This limitation is a function of the supply pumps (e.g. pump 69), pipe line losses, maximum valve orifice, and condition of the component's line strainer. The maximum permissible blend rate will be governed by that component of the blend whose flow rate approaches its maximum, first. At the start of a blending operation, the operator observes and adjusts the master oscillator to a frequency just below the limiting or "weakest" component maximum blend rate. In the above-described invention there is provided means for maintaining a blend which is produced to specification even though the production rate is reduced as a result of an accidental reduction in the supply of one or more components. The inhibiting control signal is developed as soon as one component requires a full open valve to maintain the flow rate demanded. The effect is to limit the blend rate to the maximum possible as stipulated by the "weakest" component. The blend is always within the process specification and the blend production is carried out in the minimum time under the circumstances. If taken to an extreme, for example, if a strainer in one component should slowly become clogged until the flow is completely cut off, the action would be as follows: the demand pulse generator 1 would be forced to slow down at first thus reducing the flow rate of all other components to maintain the proper blend ratios. As the pulses approach a very slow rate, a danger exists of under-ranging the flow sensors (6). To avoid this difficulty, a safety or alarm circuit may be employed to monitor the frequency of the demand pulses and automatically stop the blend operation when the pulse rate falls below a preset threshold value.

In addition to maintaining product specifications in the presence of abnormal process conditions, the system of the present invention provides additional advantages. One of these additional advantages relates to response of the system to starting transients and the resulting offset error. In the case of proportional control, as described above, the signal to the motor valve is proportional to the error output of the bi-directional accumulator. In the embodiment of the invention shown in FIGURE 6, an integrating amplifier is employed which provides a valve control signal made up of the sum of the accumulator output and its time integral. Should the output of the accumulator be any value other than a predetermined initial value, the integrating amplifier will emit a signal to the valve motor that is proportional to the time integral of the deviation. This signal is polarized so that the valve will respond in a direction to return the output of the accumulator to the initial condition.

A circuit to provide this function is shown in FIGURE 6; following a description of this circuit there is given a description of its operation. With reference to FIGURE 6, there is shown a block diagram of a digital controller in accordance with the invention having the integral action feature of the invention. The apparatus shown in FIGURE 6 is closely analogous to the apparatus in FIGURE 1 except that it has been modified to include a second amplifier which operates as an integrator. Specifically, this apparatus comprises the bi-directional accumulator 3 which is responsive to demand impulses supplied on line 2, and process pulses supplied on line 7, from flow sensor 6. The staircase error-voltage appears on line 8 and is supplied to amplifier 106 of servoamplifier 9. The valve control signal appears on output line 107 and is supplied to motor valve 12 in flow line 4, via summing network 110 and line 11.

The staircase voltage on line 8 is also supplied, via series resistor 111, to the input of operational amplifier 112. Feedback capacitor 113 connected around amplifier 112 results in a circuit which corresponds to an analog operational amplifier, connected as an integrator. The output current of the integrating amplifier is algebraically added to the output current of the amplifier 106 in network 110 to make up the total valve control current on line 11. The output of the integrating amplifier appears on line 114.

The problems associated with offset can be overcome by forcing the contents of the accumulator to return to its initial value for all disturbances such as "start up", partial restrictions, changes in total blend rate, and end-of-blend programs. The proportional section of the bi-directional accumulator may have one-hundred twenty-eight steps in the staircase to control the valve from a fully closed to a fully open condition. With a digital count of zero the analog voltage output from the valve amplifier may become, for example, 10 milliamperes. With a digital count of one-hundred twenty-eight the output from the valve amplifier may be 50 milliamperes causing the valve to fully open. Intermediate values lie linearly between these two end points. When the controller is cleared to its initial condition prior to starting a blend operation, the bi-directional accumulator will carry a digital count of sixty-four, equivalent to 30 milliamperes output to the valve or the mid-stem position. The number sixty-four in the accumulator is the reference point from which a blend is commenced and is always returned to this number in order to maintain zero offset. The integrator amplifier 112 is adjusted to integrate in a positive direction (open valve) when the accumulator 3 output is above sixty-four and in a negative direction (valve close) when the accumulator output 8 is below sixty-four. The rate of integration is proportional to the deviation between the existing accumulator output and the reference sixty-four value.

The basic principle of reset action requires that the accumulator 3 start at the number sixty-four and always return to sixty-four under steady-state conditions, no matter what valve stem position is required to provide the necessary flow rate. The output of the proportional amplifier with the number sixty-four in the accumulator is 30 milliamperes, as previously stated. In order to position the valve stem to any setting between fully closed (10 milliamperes) and fully open (50 milliamperes) while restricting the proportional amplifier to produce 30 milliamperes, requires that the reset amplifier be capable of either adding or subtracting 20 milliamperes to the 30 milliampere signal from the proportional amplifier. In practice, the reset amplifier is designed to limit at ±25 milliampere output.

Returning to the previously discussed embodiment of FIGURE 1, in which only proportional control is used, assume that the steady-state on-blend position of the valve is at the midpoint, 30 milliamperes or number sixty-four in the accumulator. Introducing the same disturbance as in the example of the first-described system, would require the accumulator to step up to the number sixty-nine in order to open the valve and return the flow rate to normal in the presence of a partially clogged strainer.

For the reset amplifier modification, as shown in FIGURE 6, the corrective action of the control loop is changed significantly. As soon as the accumulator steps away from sixty-four towards sixty-nine, the reset amplifier begins to integrate this signal and produce an output current to add to the existing current from the proportional amplifier. The result of adding this new current from the reset amplifier relieves the proportional amplifier from the task of re-establishing the steady-state. In other words, the proportional amplifier can return to its steady state value of 30 milliamperes, corresponding to a count of sixty-four in the accumulator, and the current necessary to reposition the valve stem will be added in the summing network by the reset amplifier.

Looking now at FIGURE 7 there is shown four individual waveforms which graphically represent the above-described set of orperating circumstances. In FIGURE 7 the uppermost trace, identified as 141, represents the signal input to the valve amplifier, the overall amplitude of which is determined by the accumulator (3) output. The output of the amplifier (106) is shown in the second curve 142 and comprises an analog signal, the amplitude of which is directly proportional to the mean value of the square-wave input thereto. The third curve 143 represents the reset amplifier output (114) and, as can be seen, has an excursion from zero to plus two milliamperes. The lowermost curve 144 represents the total valve current and shifts from an input or steady state condition of 30 milliamperes to 32 milliamperes.

As long as speed of response is not too critical, the system of FIGURE 6 will work entirely satisfactorily. However, the gain of the reset amplifier is kept reasonably low so that the system stability is essentially unaltered with the added reset action.

When fast blends (less than 15 minutes) are considered, the gain of the reset loop must be increased to perform its function within the time alloted. If gain is increased to perform this rate of reset action, the overall system tends to be less stable, unless some stabilizing mechanism is also added.

Referring now to FIGURE 8, there is shown still another embodiment of the invention which incorporates derivative action.

In order to meet the demands of fast blend systems, derivative action has been added to the digital controller utilizing the same secondary amplifier loop used for reset action. This arrangement is shown in FIGURE 8 and the analog operational amplifier approach can be used to explain its construction and method of operation.

There is shown in FIGURE 8 an embodiment of the invention which meets the demands of fast blend systems. In this embodiment, derivative action has been added to the digital controller utilizing the same secondary amplifier loop as used for the reset feature. That is, the circuit of FIGURE 6 has been additionally modified to include a control network in the input to the integrator amplifier. The circuit comprises a bi-directional accumulator 121 receiving demand pulses on line 2 and process pulses on line 7. Bi-directional accumulator 121 stores the accumulated difference between the total number of counts received on line 2 and line 7 in a conventional digital binary storage element. The digital binary accumulated difference stores in the bi-directional accumulator 121 is transmitted by a line 124 to digital-to-analog converter 125, which converts the digital binary accumulated difference (within the linear operating band) to a staircase error voltage. The staircase error voltage is supplied on line 8 to one input of summing network 110 and also to servoamplifier 128. The output from amplifier 128 is is supplied via line 129 to the network comprising resistors 131–132, and capacitor 133. The output of this network is supplied to integrator amplifier 134. Amplifier 134 is provided with a feedback network comprising resistor 135 and series capacitor 136. The integrated output appears on line 137 and is supplied via amplifier 138 and line 139 to a second input of summing network 110. The summed output from the summing network (110) appears on line 11 and is supplied to the motor valve (not shown).

The output of the circuit of FIGURE 8 on line 140 is proportional to the rate-of-change of the input on line 129. It is desired that integral action be obtained from some low frequency (approximately 1 c.p.s.) down to DC or zero frequency, whereas derivative action is desired at the higher frequencies, 1 c.p.s. and up. At low frequencies and as DC signals are approached, the impedance of capacitor 133 becomes much greater than resistor 132 so that resistor 132 is the dominant input of the parallel combination of network components to the very low frequency signals. In the feedback path, the impedance of capacitor 136 becomes much greater than resistor 135 at the lower frequencies so that capacitor 136 is the most influential of this series network. In other words, the circuit responds as an integrator to very low frequencies.

At higher frequencies, the impedance of capacitor 133 becomes less than resistor 132 and is the predominant input. The impedance of capacitor 136 is decreasing also at these higher frequencies so that resistor 135 becomes the predominant feedback impedance. The amplifier in this case takes on the role of derivative function.

The impedance 146 is used to bias amplifier 134 for zero integration when the input from the accumulator 125 on line 126 is at a count value of sixty-four. Impedance 146 is connected via terminal 147 to a suitable bias voltage source.

Resistor 131 is a protective current-limiting resistor of low resistance, for the amplifier 134.

Having described the construction of the circuit, the operating example mentioned hereinabove in connection with FIGURES 6 and 7 will now be considered as it would apply to the circuit of FIGURE 8. Again, the disturbance arises from a clogged strainer and the waveforms which ensue are as shown in FIGURE 9.

The first waveform is identified as 149 and illustrates the accumulator output as would appear on line 124. The second waveform is identified as 150 and illustrates amplifier 128 output as would appear on line 129. The third waveform (151) illustrates the reset signal output (137). The derivative output from network 131–133 is illustrated in the fourth waveform 152 and the actual total valve current is illustrated in the fifth waveform 153. This last waveform (153) appears on line 11. The time involved to correct for the disturbance can be seen to be shortened significantly due to the different total valve current signal when derivative action has been added. As can be seen, when the accumulator count increases from sixty-four towards sixty-nine, this signal (153) appears as a ramp function to the derivative circuit and is responsive to produce a large output so that the valve motor sees an immediate signal of large proportion calling for an opening of the valve. In the example of FIGURE 7, additional time was involved to develop the valve current. As a result of the circuit of FIGURE 8, the flow rate is returned in a much shorter time to the original value. The integral circuit in the meantime has integrated the excursion of the accumulator output (8) and produces the additional current necessary to hold the valve open and continue the original flow rate in the presence of the adverse flow restriction.

There has been described hereinabove, an automatic digital controller having improved performance over prior systems intended to accomplish generally similar purposes. In a practical construction, start-up of an automatically controlled process and the acquisition of an on-line condition, in which process specifications are fully met, may be expedited by a factor of 8:1. The obvious advantage of substantially instantaneous correction of adverse process parameters, as provided by the present invention, is particularly useful in blending systems of the type employed in the manufacture of foods, as well as in conveyor systems for truck loading since it avoids re-cycling of the load.

What is claimed is:

1. A fluid blending system comprising:
    means for producing a pacing signal in the form of a train of discrete demand pulses each of which corresponds to a unit quantity of a fluid mixture to be produced;
    a plurality of flow passages for injecting blend fluids into said mixture;
    a plurality of flow transducers, each associated with a corresponding one of said flow passages for producing a train of process pulses having a frequency proportional to the quantity of blend fluid flowing through the corresponding flow passage,
    a plurality of bi-directional accumulators each having a first input associated with a corresponding one of said flow transducers, a second input responsive to said pacing signal, and an output proportional to the numerical difference between said inputs;
    a plurality of control means each of which is located in a corresponding one of said flow passages and each of which is responsive to the output of a corresponding one of said bi-directional accumulators for controlling the quantity of fluid flow in its flow passage to correspond to a fixed proportion of said mixture; and
    means connected to said pacing signal producing means and to each of said accumulators for curtailing said pacing signal whenever one or more of the outputs of said accumulators exceeds a preset value, thus reducing the production rate of said mixture.

2. An automatic process control system for controlling the unit quantity of each component supplied to a multiple component mixture and the rate at which said mixture is produced, comprising:
    a demand pulse generator having an oscillator for generating at the output of said pulse generator a demand pulse for each unit of quantity of desired mixture and at a rate corresponding to the desired rate of production of said mixture, and
    gating means for inhibiting the generation of demand pulses at the output of said pulse generator when an inhibiting signal is applied to said gating means;
    a plurality of component controllers, each adapted to control the quantity of one of said components supplied to said mixture and the rate at which said component is supplied to said mixture; each said component controller having:
        (a) transducer means for generating a component pulse for each unit of quantity of said component supplied to said mixture and at the rate which said component is added to said mixture;

(b) a bi-directional accumulator adapted to generate a control signal at a first output corresponding to the algebraic difference between the number of pulses applied to a first input and a second input thereof, and to generate an inhibiting signal at a second output corresponding to a preselected algebraic difference between said number of pulses applied to said first and second inputs thereof;

(c) a regulator adapted to regulate the rate at which said component is added to said mixture corresponding to the value of said control signal;

(d) first coupling means for applying said control signal to said regulator; and (e) second coupling means for applying said component pulses to said first input of said accumulator;

first component controller coupling means for applying said demand pulses generated at the output of said pulse generator to the second input of each said bi-directional accumulator;

second component controller coupling means for applying said inhibiting signal generated at the second output of each said bi-directional accumulator to said gating means, whereby when said inhibiting signal is applied to said gating means, said demand pulses generated by said pulse generator are inhibited until said algebraic difference at the second output of said bi-directional accumulator generating said inhibiting signal has been reduced to below said preselected algebraic difference.

3. An automatic process control system as defined in claim 2 including in each of said component controllers ratio scaler means for generating scaled pulses at the output thereof corresponding in number to a preselected percentage of the pulses applied to the input terminal thereof, said ratio scaler means being interposed between said first component controller coupling means and the second input of said bi-directional accumulator and third coupling means for applying said scaled pulses from said output of said ratio scaler means to said second terminal of said bi-directional accumulator.

4. An automatic process control system as defined in claim 3, including in each of said ratio scaler means manual adjustment means for adjusting the preselected percentage of scaled pulses generated.

5. An automatic process control system as defined in claim 2, including in each said bi-directional accumulator integrating means for generating and adding a time integral signal to the control signal generated at said first output of each said bi-direcional accumulator.

6. An automatic process control system as defined in claim 5, including in each bi-directional accumulator differentiating means for generating and adding a derivative signal to said control signal generated at said first output of each said bi-directional accumulator.

References Cited

UNITED STATES PATENTS

| | | | |
|---|---|---|---|
| 2,239,157 | 4/1941 | Lowe | 137—101.19 |
| 3,174,298 | 3/1965 | Kleiss | 137—98 X |
| 3,229,077 | 1/1966 | Gross | 137—101.19 X |
| 3,272,217 | 9/1966 | Young | 137—101.19 |

WILLIAM F. O'DEA, Primary Examiner

D. J. ZOBKIW, Assistant Examiner

U.S. Cl. X.R.

307—229, 231; 328—127, 133